United States Patent [19]

Barlier et al.

[11] 4,346,147
[45] Aug. 24, 1982

[54] METHOD OF MANUFACTURING NITRIDED SILICON PARTS

[75] Inventors: Pernette Barlier, Paris; Jean-Paul Torre, Mennecy, both of France

[73] Assignee: Association pour la Recherche et Developpement des Methodes et Processus Industriels (ARMINES), Paris, France

[21] Appl. No.: 109,713

[22] Filed: Jan. 4, 1980

[30] Foreign Application Priority Data

Jan. 5, 1979 [FR] France ............................. 79 00268

[51] Int. Cl.$^3$ ............................................. F27B 9/04
[52] U.S. Cl. .................................. 428/446; 501/153; 501/154; 264/65; 427/216; 427/376.2; 427/399; 427/314; 427/444
[58] Field of Search .................. 427/216, 376.2, 399, 427/444, 314; 106/73.4, 55; 428/446, 450, 454; 264/65; 501/153, 154, 197

[56] References Cited

U.S. PATENT DOCUMENTS 3,811,928  5/1974  Henney et al. .................. 427/399

FOREIGN PATENT DOCUMENTS 1078022  8/1967  United Kingdom .
1277574  6/1972  United Kingdom .

OTHER PUBLICATIONS

*Journal of Material Science*, vol. 7, 1972, pp. 482–484, "The Nitriding of Silicon Powder Compacts".

*Primary Examiner*—George F. Lesmes
*Assistant Examiner*—E. Rollins Buffalow
*Attorney, Agent, or Firm*—Sughrue, Mion, Zinn, Macpeak & Seas

[57] ABSTRACT

A method of manufacturing nitrided silicon parts which retain their mechanical properties after hot oxidation, said method consisting of sintering silicon powder in an atmosphere which is rich in nitrogen. 1% to 10% by weight of aluminium powder is added to the silicon before sintering thereof and preliminary hot oxidation is effected in conditions which allow acicular mullite to form by the direct action of the aluminium and of a complement of oxygen molecules supplied by the outside medium on the silicon formed.

6 Claims, No Drawings

METHOD OF MANUFACTURING NITRIDED SILICON PARTS

The present invention relates to a material which is oxidation resistant when hot, said material being formed by a solid solution of aluminium and oxygen in silicon nitride, of the $\beta'$-SiAlON type. It also relates to a method of manufacturing such a material.

It is known that nitrided silicon is a very advantageous material due to its high-temperature withstanding qualities. Further, in their article on pages 1725 to 1733 of the 1976 issue No. 11 of the Journal of Materials Science, J. P. Torre and A. Mocellin show that the nitridation of silicon parts requires a very low oxygen partial pressure to be maintained so as to avoid the stabilization of a surface layer of silica on the particles of the initial powder and the appearance in the parts of relatively large pores and of micro non-uniformities in structure. This control of the oxygen partial pressure inside the parts being sintered can be obtained by adding a small quantity of aluminium powder (e.g. 6% by weight) to the silicon powder. This gives a solid solution of the SiAlON type.

However, it is observed that generally, the mechanical strength of nitrided silicon parts and sometimes, even, of those to which a small quantity of aluminium is added, is appreciably reduced after they have been subjected to oxidation when hot. This appears to be due to the fact that the parts subjected to oxidation becomes covered with a surface layer of silica which, at high temperatures at which hot oxidation takes place, is transformed into the $\beta$ crystallographic variety of cristobalite. When transformed into the $\alpha$ variety during cooling, the cristobalite contracts suddenly, causing the oxidized layer to crack. Such cracking reduces the mechanical strength of the oxidized layer. Now, the most frequently envisaged applications for nitrided silicon, namely, parts for high-performance Diesel engines and turboshaft engines entail the use of an oxidizing gaseous mixture.

One aim of the invention is therefore to provide a material which retains its mechanical strength after hot oxidation.

The material according to the invention is characterized in that it contains 1 to 10% by weight of aluminium with respect to silicon, and includes a surface layer of acicular mullite.

The method of manufacturing the above material in accordance with the invention is characterized in that about 1% to 10% by weight of aluminium is added to the silicon powder before nitriding, sintering thereof in an atmosphere rich in nitrogen, in that the silicon nitride sintered with aluminium is subjected to preliminary oxidation while hot in conditions such that the aluminium and oxygen supplied by the ambient atmosphere react on the silica formed at the surface to form acicular mullite.

Further, it also has at least one of the following characteristics:
sintering is carried out on the silicon powder with a Blaine surface area of at least 5000 cm$^2$/g and preferably at least 7500 cm$^2$/g;
preliminary hot oxidation is carried out at about 1400° C. in air for at least 50 hours; and
the nitrided silicon parts are subjected to a vibratory movement during their preliminary hot oxidation.

It will be understood that the effect of adding 1 to 10% by weight of aluminium powder to silicon powder on the improvement of the mechanical strength after the hot oxidation of the nitrided silicon parts and the effect of adding aluminium to silicon to prevent large pores and micro-nonuniformities of structure from being formed are independent from each other. Therefore, the addition of a small quantity of aluminium which is insufficient to form such pores and micro-nonuniformities can, however, maintain mechanical strength after hot oxidation, even if said mechanical strength is lower than that of parts which are free from large pores and nonuniformity of structure.

A method in accordance with the invention of preparing nitrided silicon parts and their resistance to bending before and after hot oxidation as compared with that of parts according to the prior art are described hereinafter by way of example.

Nitrided silicon parts were prepared from either very pure (99.96%) silicon powders commercialized by the American firm Cerac, firstly in the raw state with a Blaine specific surface area of 2500 cm$^2$/g, secondly after crushing until a Blaine specific surface area of 5500 cm$^2$/g is obtained, or silicon powders of a quality such as that sold by the German firm Starck, said powders having a purity of 99% and a specific surface area of 7700 cm$^2$/g. Aluminium powder with a purity of 99% and a specific surface area of 10,000 cm$^2$/g commercialized by the French firm Baudier was used.

In all cases, 6% by weight of aluminium powder was added to the silicon powder. After dry mixing for 24 hours in a Turbula mixer, test bars were pressed without any binding agent in an isostatic manner at 196 MN/m$^2$.

The compressed test bars, cut in the form of parallelpipedical bars whose approximate dimensions were 30×10×6 mm were nitrided in batches of 10 bars in a horizontal oven with silicon carbide rods. The heat treatment program was as follows:
ambient temperature raised to 1350° C. over 6 hours;
ambient temperature maintained at 1350° C. for 72 hours;
ambient temperature raised from 1350° C. to 1450° C. over 6 hours;
ambient temperature maintained at 1450° C. for 24 hours; and
cooling down to ambient temperatures over about twelve hours.

Throughout the treatments, the (mullite) laboratory tube of the oven was supplied with a gaseous mixture which contained 70% of nitrogen and 30% of argon at a total pressure of 1.4 atmospheres. Depending on the grain size of the initial powder, the flow rate and the oxygen content of the nitriding gas (fixed by the temperature of a mixture of oxides CuO/Cu$_2$O placed in an annexed oven at the inlet end of the nitriding oven) were varied. The flow rates and oxygen contents used lay respectively between 0.9 and 1.8 hourly changes of the atmosphere in the oven and 450 and 100 parts per million.

The nitrided samples were then machined in the form of test bars with dimensions of 25×5×1.5 mm some of which were broken during four-point bending tests. The others were oxidized at 1400° C. in air in the (mullite) laboratory tubes of horizontal ovens with silicon carbide heating elements. The samples were brought into the heart of the hot zones of the preheated ovens over two hours and maintained for 50 to 120 hours at the ends of mullite rods to which a vibratory movement was imparted so as to prevent any protective gaseous limit layer from being formed around the samples.

The table hereinafter compares the values of the resistance to breaking by bending of the test bars, before and after oxidation with the values of commercial samples of nitrided silicon free from aluminium, supplied by the Germany company Rosenthal and which were machined, oxidized and broken under the same conditions as the samples in accordance with the invention: in no case did oxidation cause any appreciable reduction in the resistance to breakage of the samples of the invention, whereas the resistance to breakage of the known commercial product was reduced by about half in every case.

| Origin of the samples | State of Oxidation | Average resistance to breakage (4-point bending) |
| --- | --- | --- |
| Original powder: CERAC Si + 6% Al Specific surface area of the silicon: 2500 cm$^2$/g | N/A | 157.8 ± 23.1 MN/m$^2$ |
| | 50 to 120 hours at 1400° C. | 152.5 ± 9.9 MN/m$^2$ |
| Original powder: CERAC Si + 6% Al Specific surface area of the silicon 5500 cm$^2$/g | N/A | 162.6 ± 16.2 MN/m$^2$ |
| | 50 to 120 hours at 1400° C. | 158.5 ± 17.2 MN/m$^2$ |
| Original powder: STARCK Si + 6% Al Specific surface area of the silicon: 7700 cm$^2$/g | N/A | 173.0 ± 9.9 MN/m$^2$ |
| | 50 to 120 hours at 1400° C. | 166.0 ± 23.0 MN/m$^2$ |
| Known nitrided silicon | N/A | 183.5 ± 12.0 MN/m$^2$ |
| | 50 to 120 hours at 1400° C. | 91.3 ± 2.1 MN/m$^2$ |

Although the manufacturing method which has just been described in detail hereinabove appears to be the preferred embodiment of the invention, it will be understood that various modifications can be made thereto without going beyond the scope of the invention. In particular, the heat treatment nitriding programme can be different. The atmosphere thereof can consist of pure nitrogen (except for the small quantity of oxygen) instead of a mixture of nitrogen and argon. The preliminary oxidation can be effected while leaving the parts motionless provided that the gaseous atmosphere at the surfaces of the parts is changed sufficiently frequently.

The invention applies to the manufacture of all parts which must withstand simultaneously high temperatures and an oxidizing atmosphere, in particular parts for turboshaft engines and internal combustion engines.

We claim:

1. A material which is oxidation resistant when hot, said material being formed by a solid solution of aluminum and oxygen in silicon nitride, of the $\beta'$-SiAlON type and being formed by nitriding sintering of silicon powder in an atmosphere rich in nitrogen, the improvement comprising adding about 1 to 10% by weight of aluminum to the silicon powder before sintering thereof and subjecting the silicon nitride sintered with aluminum to preliminary oxidation while hot under conditions such that the aluminum and oxygen supplied by ambient atmosphere react on the silica formed at the surface to form a surface layer of acicular mullite.

2. A method of manufacturing a material which is oxidation resistant when hot by nitriding sintering of the silicon powder in an atmosphere rich in nitrogen, wherein about 1% to 10% by weight of aluminum is added to the silicon powder before sintering thereof, and wherein the silicon nitride sintered with aluminum is subjected to preliminary oxidation while hot under conditions such that the aluminum and oxygen supplied by the ambient atmosphere react on the silica formed at the surface to form acicular mullite.

3. A method according to claim 2, characterized in that nitriding sintering is carried out on the silicon powder with a Blaine specific surface area of at least 5000 cm$^2$/g.

4. A method according to claim 3, characterized in that nitriding sintering is carried out on the silicon powder with a Blaine specific surface area of at least 7500 cm$^2$/g.

5. A method according to claim 2, characterized in that preliminary hot oxidation is carried out at about 1400° C. in air for at least 50 hours.

6. A method according to claim 2, characterized in that the nitrided silicon parts to which aluminium was added are subjected to a vibratory movement during their preliminary hot oxidation.

* * * * *